(12) United States Patent
Kinney

(10) Patent No.: US 10,375,303 B1
(45) Date of Patent: Aug. 6, 2019

(54) ULTRA-HIGH RESOLUTION CINEMA CAMERA SYSTEM

(71) Applicant: Samuel Raymond Kinney, Medford, OR (US)

(72) Inventor: Samuel Raymond Kinney, Medford, OR (US)

( * ) Notice: Subject to any disclaimer, the term of this patent is extended or adjusted under 35 U.S.C. 154(b) by 0 days.

(21) Appl. No.: 16/041,678

(22) Filed: Jul. 20, 2018

Related U.S. Application Data

(60) Provisional application No. 62/536,046, filed on Jul. 24, 2017.

(51) Int. Cl.
*H04N 5/232* (2006.01)
*H04N 5/225* (2006.01)
*B33Y 70/00* (2015.01)

(52) U.S. Cl.
CPC .......... *H04N 5/23232* (2013.01); *B33Y 70/00* (2014.12); *H04N 5/2252* (2013.01); *H04N 5/22525* (2018.08); *H04N 5/23216* (2013.01); *H04N 5/232121* (2018.08)

(58) Field of Classification Search
CPC .................................................. H04N 5/23232
USPC ........................................................ 348/374
See application file for complete search history.

(56) References Cited

U.S. PATENT DOCUMENTS

| | | | |
|---|---|---|---|
| 4,510,529 A | 4/1985 | Gottschalk | |
| 7,663,687 B2 | 2/2010 | Neufeld | |
| 9,245,314 B2 | 1/2016 | Jannard et al. | |
| 9,436,976 B2 | 9/2016 | Jannard et al. | |
| 9,565,941 B2 | 2/2017 | Presler | |
| 2004/0125361 A1* | 7/2004 | Riza | G01J 1/4257 356/121 |
| 2014/0348489 A1 | 11/2014 | Stephens et al. | |
| 2016/0381338 A1 | 12/2016 | Liu et al. | |
| 2017/0053385 A1* | 2/2017 | Jannard | H04N 5/3675 |

* cited by examiner

*Primary Examiner* — Joel W Fosselman
(74) *Attorney, Agent, or Firm* — Jerry Haynes Law

(57) ABSTRACT

An ultra-high resolution cinema camera system collects light from a captured image with a 120 mm image format lens, and then optimizes the light in an image sensor having a plurality of 13.8 micron photosites that convert the captured light to binary signals. The camera system also provides a Field Programmable Gate Array that converts the binary signals through Analog-to-Digital Conversion technology, so as to process the binary signal into a full resolution RAW or ProRes video files. The RAW or ProRes video file is processed and stored in embedded stacked memory units, and then distributed through a signal distribution portion to create a modern cinema effect of a captured image. The camera system is unique in that it is digital and does not utilize 35 mm or 65/70 mm film formats, as known in the art. The 120 mm×67.5 mm format utilized by the camera system allows for the industry standard aspect ratios.

20 Claims, 6 Drawing Sheets

ULTRA-HIGH RESOLUTION CINEMA CAMERA SYSTEM

CROSS-REFERENCE TO RELATED APPLICATIONS

This application claims priority from U.S. Provisional Application Ser. No. 62/536,046, entitled "Ultra-High Resolution Cinema Camera System", filed on Jul. 24, 2017, which application is hereby incorporated herein by reference in its entirety.

FIELD OF THE INVENTION

The present invention relates generally to a camera system. More so, the present invention relates to an ultra-high resolution cinema camera system.

BACKGROUND OF THE INVENTION

For many years, film cameras were the only option for capturing cinema quality motion pictures. The time requirements and costs related to shooting and processing motion picture images on film stock and then transferring those images into a digital form have created a need for motion picture cameras that capture high definition or cinema resolution imagery directly in a digital form. In the past few years, while several digital cinema cameras have emerged on the market these digital cinema cameras are complex designs that require the use of a multiple sensor prism block which, in turn, requires use of complex and expensive optics.

Many digital still cameras or dual-mode video and still camcorders are available in the market which use higher resolution single image sensors with color filter arrays, however, these digital still cameras and camcorders have slow readout architectures (e.g., a DSLR may only shoot four frames per second (fps) and can only achieve video rate preview at low resolution (e.g., 640×480) or standard definition (e.g., VGA 640×480 at 30 fps). In addition, the interpolation and color processing applied to the source raw data in these type of devices initially generates data sets that are larger than the source raw data which, in turn, requires the application of higher compression to fit the data sets into a target storage capacity. This typically results in a reduction in image quality compared to the original image or a coded version of the raw data.

Currently a few single sensor cameras have been developed for use in content creation for delivery at 2K, 4K and Stereo formats, however these cameras use sensor technology that is trending towards smaller sensors that make up for less light collection with more powerful processing to clean up the image noise. Further the disadvantage of the current digital 35 mm film format and any variations based on that design used by these type of cameras, including the current latest format of digital 65 mm are found in the inability to have large numbers of photosites that are also large enough to collect the amount of light needed to provide truly high quality images. This is because of the industry's adherence to the 35 mm format as well as the absence of innovative design aimed at increasing light gathering capabilities as well as providing a format and resolution never seen before. Lens availability is also a factor as 35 mm format has been an industry standard for many decades.

Numerous attempts have been made to develop cinema camera systems. Even though these innovations may be suitable for the specific purposes to which they address, however, they would not be as suitable for the purposes of the present invention.

For example, U.S. Pat. No. 4,510,529 to Gottschalk discloses a camera for cinematography that uses the same lens assembly for a television camera and its monitor as is used with a viewfinder eyepiece assembly, so that the scene in the viewfinder eyepiece assembly is the same as that presented to the television camera and depicted on its monitor.

U.S. Pat. No. 7,663,687 to Neufeld teaches a digital cinema camera that includes a plurality of imagers and a plurality of shutters mounted radially on a frame. A beam splitter disposed at a center of the frame rotates to provide an input optical beam sequentially to the plurality of imagers by triggering the corresponding shutters. The electrical signals generated by the imagers are first stored in a removable magazine.

U.S. Pat. Nos. 9,245,314, 9,436,976, and U.S. Pat. Application No. 20170053385 to Jannard et al. describe a video camera comprising a housing, a memory device, image processing module and a compression module, an image sensor, wherein the video camera being configured to output the raw mosaiced image data at a resolution of at least 2k and at a frame rate of at least about 23 frames per second.

U.S. Pat. No. 9,565,419 to Presler discloses a digital camera system that includes an optical assembly to gather light from a desired scene, a modular imaging subsystem aligned with the optical assembly, and an image processing, recording and display subsystem, wherein the modular imaging sub-system comprising an imager including at least one array of pixels aligned with the optical assembly to produce a minimum of 10-bits per pixel of color data, and a frame grabber capturing raw image data output from the imager and outputting a serial data rate of at least 48 megabytes per second of non-interpolated color filtered pixel data.

U.S. Pat. Application No. 20140348489 to Stephens et al. describes a method for recording images comprising receiving and storing the optical effects selection as effects metadata; recording the raw image data using a sensor of the digital camera; applying the selected optical effect to the raw image data according to the optical effects parameter to create processed image data while preserving the recorded raw image data; and displaying the processed image data on a display of the digital camera.

U.S. Pat. Application No. 20160381338 to LIU et al. describes an image signal processing apparatus that includes a field programmable gate array (FPGA) device, which operates to receive one or more image data from an image sensor and then forward the received image data to an image signal processor to compress the received image data and save the compressed image data in a first storage medium.

It is apparent now that numerous innovations that are adapted to a cinema camera system that captures high resolution moving images have been developed in the prior art that are adequate for various purposes. Furthermore, even though these innovations may be suitable for the specific purposes to which they address, accordingly, they would not be suitable for the purposes of the present invention as heretofore described. Thus an ultra-high resolution cinema camera system that digitally captures images through the collection of more light and the high quality retention of that light to provide the camera with the highest amount of pure and clean image data, so as to create an ultra-high resolution digital format of the image is needed.

SUMMARY OF THE INVENTION

The present invention relates to an ultra-high resolution cinema camera system that digitally captures one or more images by gathering light through a 120 mm image format lens, and then optimizing the light through an image sensor that has 13.8 micron photosites adapted to convert the light into binary signals; whereby a field programmable gate array converts the binary signal through Analog-to-Digital Conversion technology, into a full resolution RAW or ProRes video file; whereby the RAW or ProRes video file is stored at high speeds in an embedded stacked and interconnected Multi-Media Controller; whereby the RAW or ProRes video file of the image is distributed to a monitoring bank, a recording bank, and signal distribution ports for viewing the captured image; and whereby the camera system is digital and does not use the 35 mm or 65/70 mm film formats known in the art.

According to an aspect of the present invention, an ultra-high resolution cinema camera system, comprises: a housing defined by an outer surface and an inner surface that form a cavity, the housing forming an air vent operable to enable passage of air in and out of the cavity of the housing to dissipate heat from the cavity of the housing; at least one handle joined with the housing, the at least one handle operable to facilitate manipulation of the camera system; a 120 millimeter lens operable to capture light; an image sensor operable to optimize the collected light from the 120 millimeter lens, the image sensor comprising a plurality of photosites, the photosites defined by dimensions of about microns, the photosites operable to convert the light to a binary signal; a field programmable gate array operatively connected to the image sensor through a multi-channel cable, the field programmable gate array operable to convert the binary signal to a RAW or ProRes video file; a plurality of stacked memory units operatively connected to the field programmable gate array through the multi-channel cable, the plurality of stacked and interconnected memory units embedded in the housing that are operable to store the RAW or ProRes video file; a signal distribution portion operatively connected to the plurality of stacked memory units through the multi-channel cable, the signal distribution portion operable to distribute the RAW or ProRes video file through at least one of the following: a monitoring bank, a recording bank, and a plurality of signal distribution ports; a control panel operable to control the camera system; a battery mount operable to operatively mate with a power source for powering the camera system; a power switch operable to regulate powering on and off the camera system; a viewfinder eyepiece assembly operable to enable composing and focusing an image from light gathered by the 120 millimeter lens; a recording switch operable to regulate capturing a video of the image; and a recording light operatively connected to the recording switch to indicate that the image is captured as video.

In view of the foregoing, it is therefore an objective of the present invention to provide modern cinema with a new tool to see the world in a different perspective.

Another objective is to provide a digital cinema camera.

Another objective is to provide a cinema camera that uses a 120 mm image format lens.

Another objective is to provide a larger image sensor and stronger processor to handle large amounts of data.

Another objective is to create an ultra-high resolution video through use of a field programmable gate array.

Another objective is to provide a stacked memory unit for faster processing and storage of video files.

Another objective is to provide an inexpensive to manufacture ultra-high resolution cinema camera system.

Other objectives and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
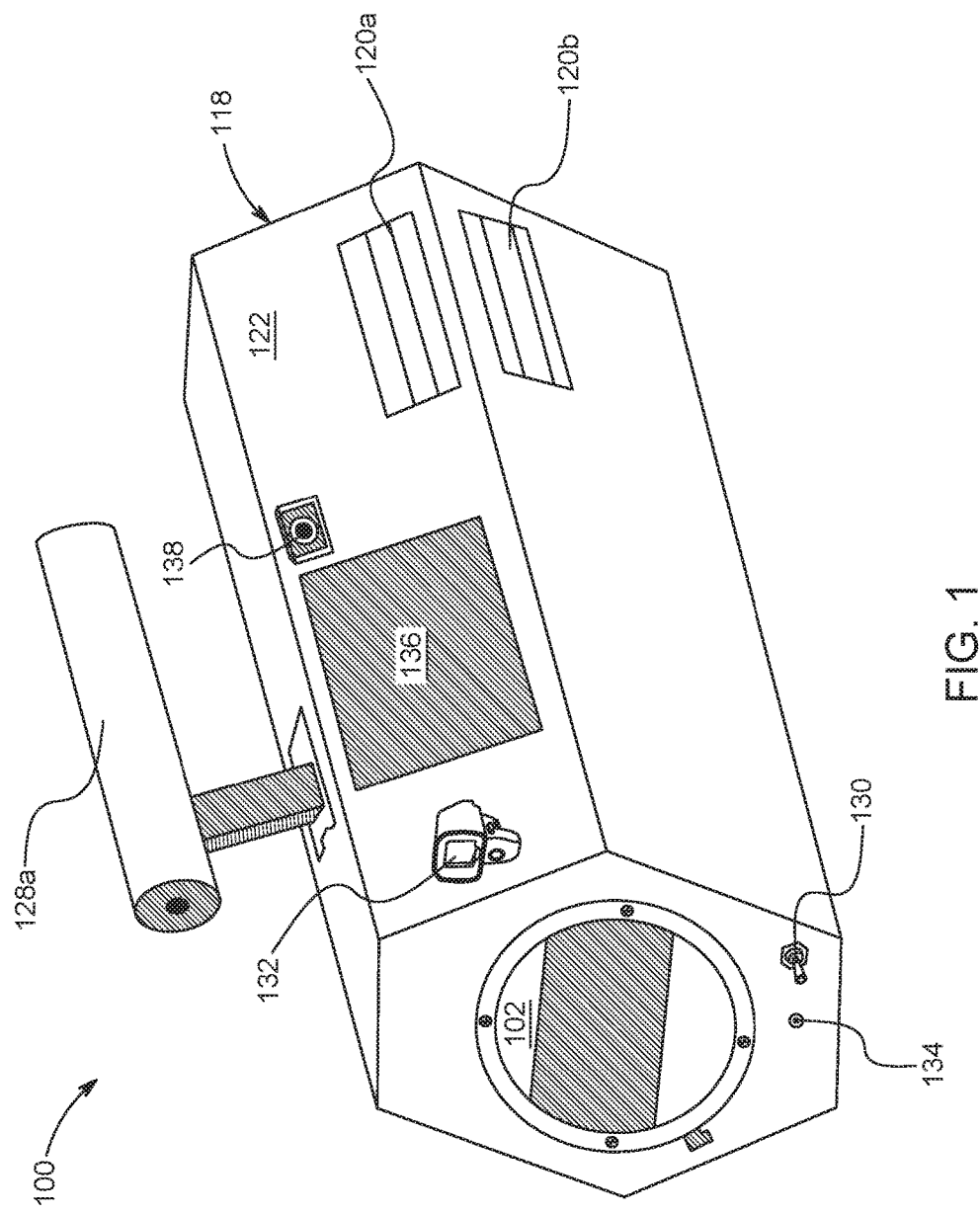
FIG. 1 illustrates a front perspective view of an exemplary ultra-high resolution cinema camera system, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An ultra-high resolution cinema camera system 100 is referenced in FIGS. 1-5. The ultra-high resolution cinema camera system 100 is configured to digitally capture an image in a 120 mm×67.5 mm digital format so as to create an ultra-high resolution digital format suitable for modern cinematography. The ultra-high resolution cinema camera system 100, hereafter "camera system 100", is unique through the use of a larger 120 mm image format lens 102 than that known in the art for digital cinema cameras. Further, the image quality benefits of using the larger lens are paired with the use of a large image sensor 104 that is coupled with photosites 106, a cutting edge analog-to-digital converter (ADC), and processing technology. The camera system 100 further provides advanced high-resolution cinema camera options, a Field Programmable Gate Array 108 (FPGA), and a plurality of stacked embedded multi-media controller memory units 110 (eMMC) (also referred to as stacked memory unit) that process and store signals to help cancel excess noise and handle large amounts of data 102.

The camera system 100 is also unique in that it is digital and does not utilize the industry standard 35 mm or 65/70 mm film format known in the art. The 120 mm×67.5 mm digital format is utilized by the camera system 100 which is unique and does allow for the industry standard aspect ratios.

It is significant to note that such a camera system 100 can be used for making movies at a higher resolution and color depths than current hardware can support. By way of example, for slow motion video, from 48 frames per second (fps) to about 500 fps can be filmed easily using conventional film emulsion. Current technology imagers generally cannot support such high speed filming at the desired resolution. The use of the large image sensor 104 coupled with cutting edge analog-to-digital converters (ADC), FPGA 108, eMMC 110, and processing technology enables filming in the desired digital high-resolution format from 48 fps up to 120 fps.

As shown in FIGS. 1-6 illustrating, the camera system 100 provides a unique housing 118 (FIG. 1-5) that is efficiently fabricated through use of a 3-dimensional printer or any other methods known in the prior art without departing from the scope and spirit of the present invention. The housing 118 is coated with an ultrathin coating to resist corrosion and scratching. Further, the camera system 100 comprises a 120 millimeter (mm) lens 102 that is configured to efficiently collect light from an image. An image sensor 104 (FIG. 4) receives and optimizes the captured light from the 120 mm lens 102. A plurality of 13.8 micron photosites 106 (FIG. 4) embedded in the image sensor 104 that converts the captured light to binary signals.

Figure 2:
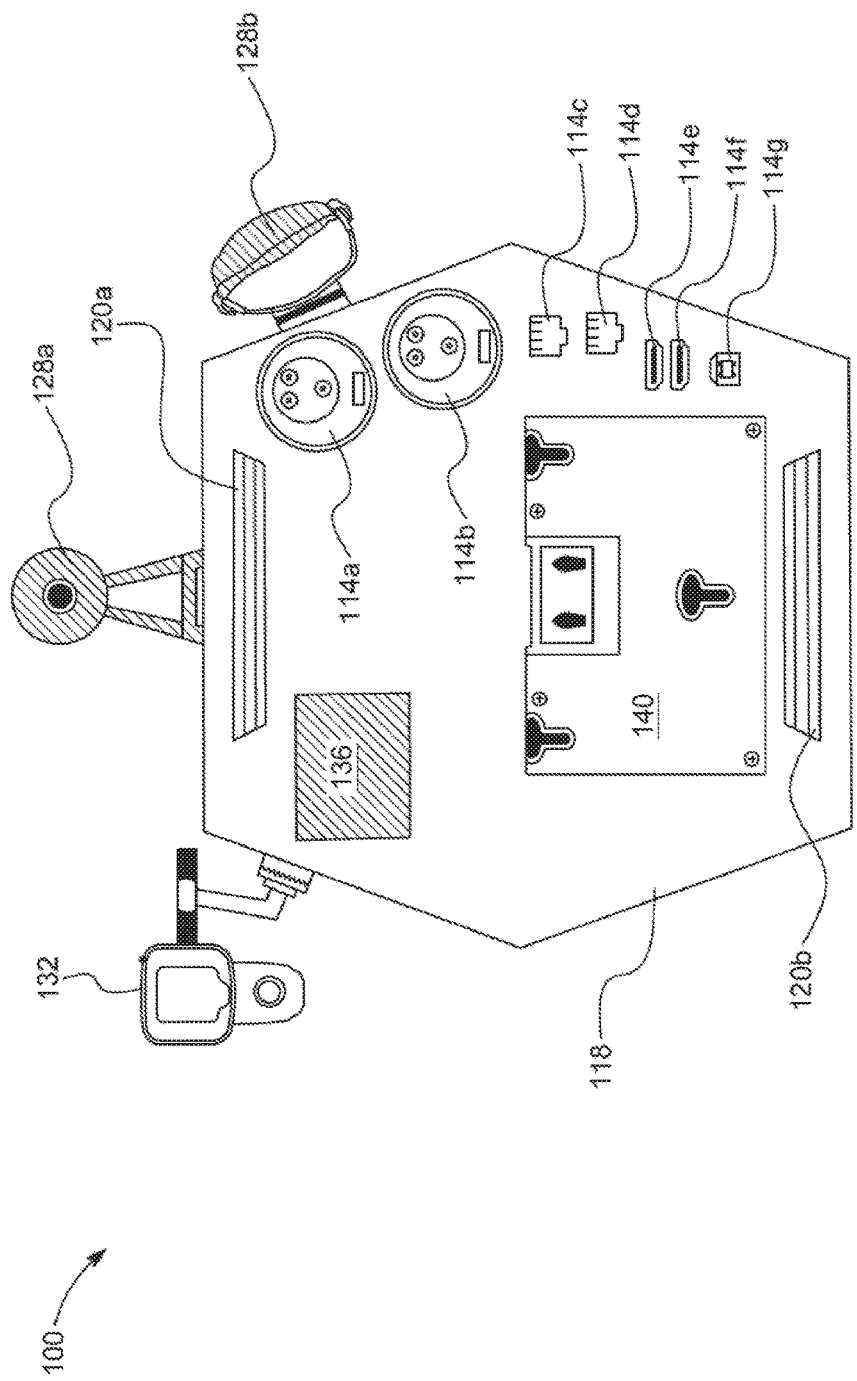
FIG. 2 illustrates a rear view of the ultra-high resolution cinema camera system shown in FIG. 1, in accordance with an embodiment of the present invention.
Figure 4:
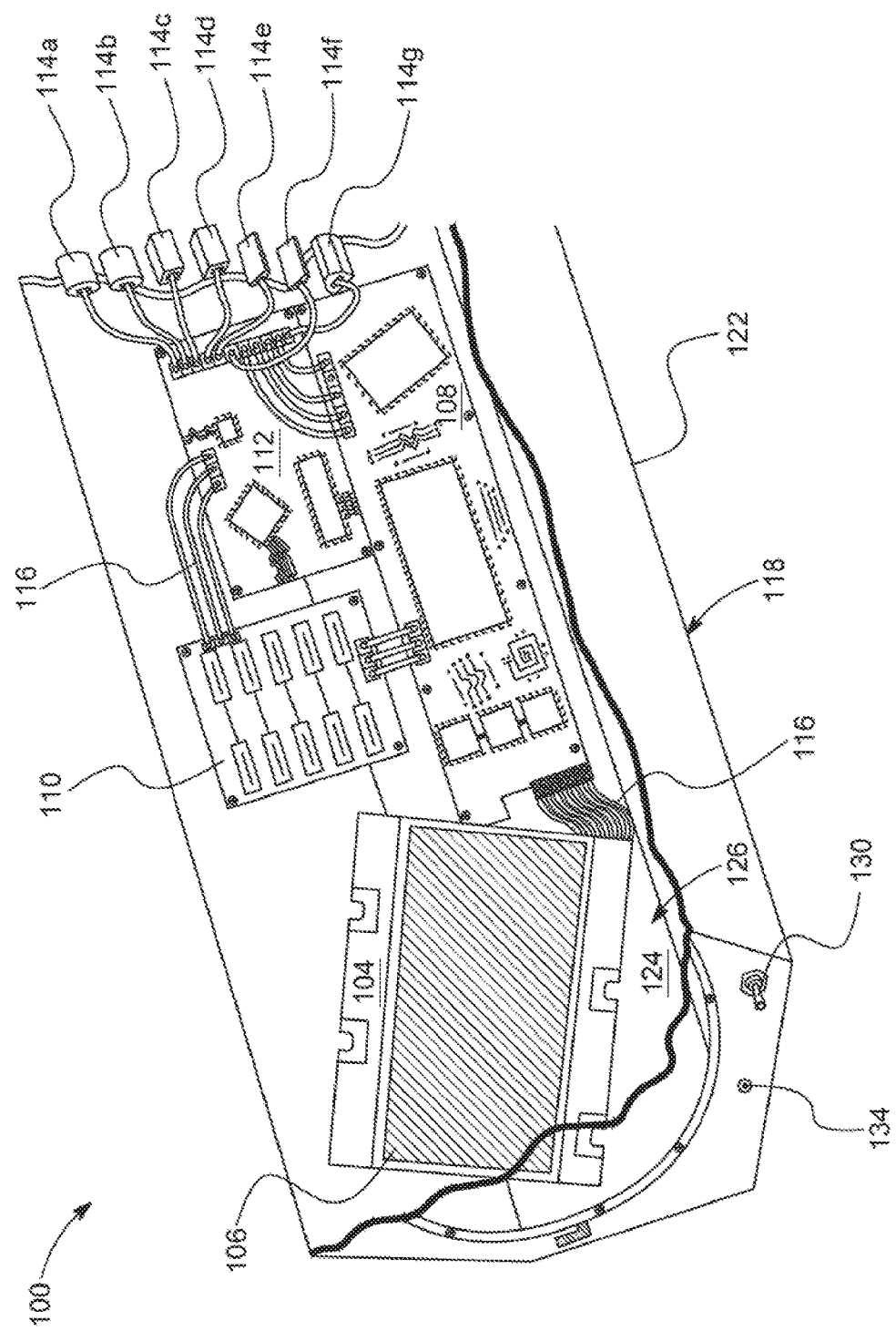
FIG. 4 illustrates a section view of the ultra-high resolution cinema camera system shown in FIG. 1, illustrating the internal electrical components and hardware, in accordance with an embodiment of the present invention.
Figure 5:
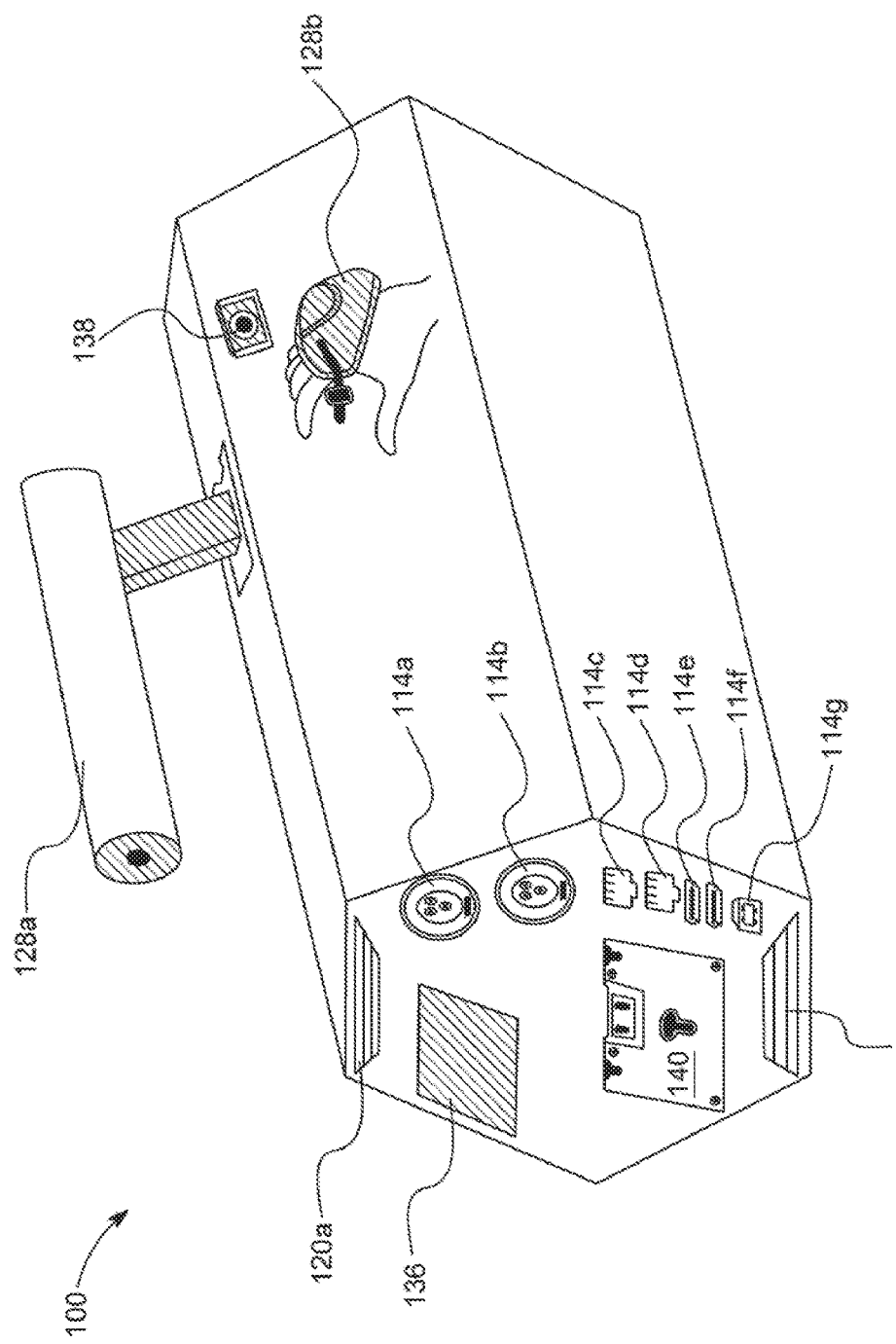
FIG. 5 illustrates a rear perspective view of the ultra-high resolution cinema camera system shown in FIG. 1, in accordance with an embodiment of the present invention.

The camera system 100 also provides a field programmable gate array (FPGA) 108 (FIG. 4) that converts the binary signals from the photosites 106 through Analog-to-Digital Conversion (ADC) technology, so as to process the binary signal into a full resolution RAW or ProRes video files. From the FPGA 108, the RAW or ProRes video file is processed and stored in a plurality of eMMC 110 (FIG. 4), and then distributed through a signal distribution portion 112 comprising various signal distribution output ports 114a-g (FIGS. 2, 4 and 5). In this manner, the camera system 100 creates a modern cinema effect of the captured image.

In one aspect, an ultra-high resolution cinema camera system 100n comprising: a housing 118 defined by an outer surface 122 and an inner surface 124 that form a cavity 126; a power source 140 for powering the camera system 100; a switch 138 operable to regulate capturing an image or video data; a 120 mm lens 102 operable to capture light from the image or video data; an image sensor 104 operable to optimize the captured light from the 120 mm lens 102, the image sensor 104 comprising a plurality of photosites 106, the photosites 106 defined by dimensions of 13.8 microns, the photosites 106 operable to convert the light to a binary signal through one or more analog-to-digital converters (not shown); a field programmable gate array (FPGA) 108 operatively connected to the image sensor 104 through a multi-channel cable 116, the field programmable gate array 108 is operable to convert the binary signal to an ultra-high resolution RAW or ProRes image or video data; a plurality of stacked and interconnected embedded multi-media memory controller units 110 (also referred as stacked and interconnected memory units) operatively connected to the field programmable gate array 108 through the multi-channel cable 116, the plurality of stacked and interconnected memory units 110 operable to store the ultra-high resolution RAW or ProRes image or video data; a signal distribution portion 112 operatively connected to the plurality of stacked and interconnected memory units 110 through the multi-channel cable 116, the signal distribution portion 112 operable to distribute the ultra-high resolution RAW or ProRes image or video data through at least one of the following: a monitoring bank, a recording bank, and a plurality of signal distribution ports 114a-g; and a control panel 136 operable to control the camera system 100.

In another aspect, the image sensor 104 captures 120 mm×67.5 mm digital format RAW and PRORES HDR 8692×4889 8.6K resolution video data in both the industry standard 16×9 (1.77:1) aspect ratio, and the anamorphic aspect ratios of 2×(3.55:1); 1.5×(2.66:1); 1.35×(2.39:1); and 1.33×(2.35:1) at up to 120 fps.

In another aspect, the plurality of signal distribution ports 114a-g include at least one of the following: an Ethernet port, an HDMI port, a USB 3.0 port, and an output audio port.

In another aspect, the camera system 100 further comprises a viewfinder eyepiece assembly 132 operable to enable composing and focusing an image from light gathered by the 120 mm lens 102.

In another aspect, the camera system 100 further comprises at least one handle 128a-b joined with the housing 118, the at least one handle 128a-b operable to facilitate manipulation of the camera system 100.

In another aspect, the housing 118 further comprises one or more air vents 120a-b operable to enable passage of air in and out of the cavity of the housing so as to facilitate heat dissipation.

In another aspect, the power source 140 is a rechargeable battery.

In another aspect, the housing 118 is fabricated from material that is selected from the group consisting of Kevlar, Fiberglass, Nylon, and Carbon Fiber, further the outer and the inner surfaces 122, 124 of the housing 118 is coated with a polymer-ceramic composition. Although other suitable materials can be used without departing from the scope and spirit of the present invention.

In another aspect, the housing 118 is fabricated using a 3-dimensional printer.

In another aspect, the image sensor 104 is an 8.6k image sensor.

In another aspect, the control panel 136 is a touch screen.

According to another aspect of the present invention, an automatic ultra-high resolution cinema camera system 100 comprising: a housing 118 defined by an outer surface 122 and an inner surface 124 that form a cavity 126, the housing 118 forming at least one air vent 120a-b operable to enable passage of air in and out of the cavity 126 of the housing 118, wherein the housing 118 is fabricated from material that is selected from the group consisting of Kevlar, Fiberglass, Nylon, and Carbon Fiber, further the outer and the inner surfaces 122, 124 of the housing 118 is coated with a polymer-ceramic composition; at least one handle 128a-b joined with the housing 118, the at least one handle 128a-b operable to facilitate manipulation of the camera system 100; a rechargeable battery mount 140 operable to operatively mate with a power source for powering the camera system 100; a power switch 130 operable to regulate powering on and off the camera system 100; a recording switch 138 operable to regulate capturing a video; a recording light 134 operatively connected to the recording switch 138 to indicate that the video is being captured; a 120 mm lens operable to capture light for the video image; a viewfinder eyepiece assembly operable to enable composing and focusing an image from light gathered by the 120 mm lens 102; an image sensor 104 include a solid-state device (not shown), adapted to efficiently capture light from the 120 mm lens 102 and optimizes the captured light from the 120 mm lens 102, the image sensor 104 comprising a plurality of photosites 106, the photosites 106 defined by dimensions of 13.8 microns, the photosites 106 operable to convert the light to a binary signal through an analog-to-digital converter (not shown), wherein the image sensor 104 is a 120 mm×67.5 mm sensor; a field programmable gate array 108 operatively connected to the analog-to-digital converter of the image sensor 104 through a 14 bit low voltage differential signaling (LVDS) (not shown) thereby facilitating to transmit the binary signal to the field programmable gate array 108 through a multi-channel cable 116, the field programmable gate array 108 operable to convert the binary signal to an ultra-high resolution RAW or ProRes video data; a plurality of embedded stacked and interconnected memory units 110 operatively connected to the field programmable gate array 108 through the multi-channel cable 116, the plurality of stacked and interconnected memory units 110 operable to store the RAW or ProRes video data; a signal distribution portion 112 operatively connected to the plurality of stacked and interconnected memory units 110 through the multi-channel cable 110, the signal distribution portion 112 operable to distribute the RAW or ProRes video data through at least one of the following: a monitoring bank, a recording bank, and a plurality of signal distribution ports 114a-g; and a control panel 136 operable to control the camera system 100.

In another aspect, the camera system 100 comprises a portable digital camera.

In another aspect, the handle comprises a top handle 128a fabricated from black carbon fiber and a side grip handle 128b that is configured to wrap around hand of a user.

In another aspect, the power switch 130 may include a toggle switch or a push button with a flip cover.

Those skilled in the art will recognize that current sensor technology is trending towards smaller sensors that make up for a lesser light collection with more powerful processing, so as to clean image noise. The present invention, however, utilizes larger sensors 104 coupled with cutting edge analog-to-digital converters (ADC) (not shown) and processing technology to address the image quality issue, as well as to provide advanced high-resolution cinema camera options. Thus, through the collection of more light and the high-quality retention of that light to provide the camera 100 with the highest amount of pure and clean image data as possible to enhance modern cinema.

As referenced in FIGS. 1-2, the camera system 100 includes a housing 118 that forms a protective enclosure for the electrical components discussed below. The housing 118 is defined by an outer surface 122 and an inner surface 124 that form a cavity 126. In some embodiments, the housing 118 may be fabricated with a 3-dimensional printer, using a combination of Kevlar, Fiberglass, Nylon, and Carbon Fiber. In this manner, the housing 118 forms a durable shell for the internal and external electrical and hardware components.

Once fabricated with the three-dimensional printer or by using other methods known in the art, the housing 118 is coated on the outer and inner surfaces 122, 124 with an ultra-thin composition. The composition may include a heat applied polymer-ceramic. This coating forms a scratch and corrosion resistant finish for all-purpose use in all conditions, so as to ensure the longevity of the housing 118 and inner components and hardware of the camera system 100.

Figure 3:
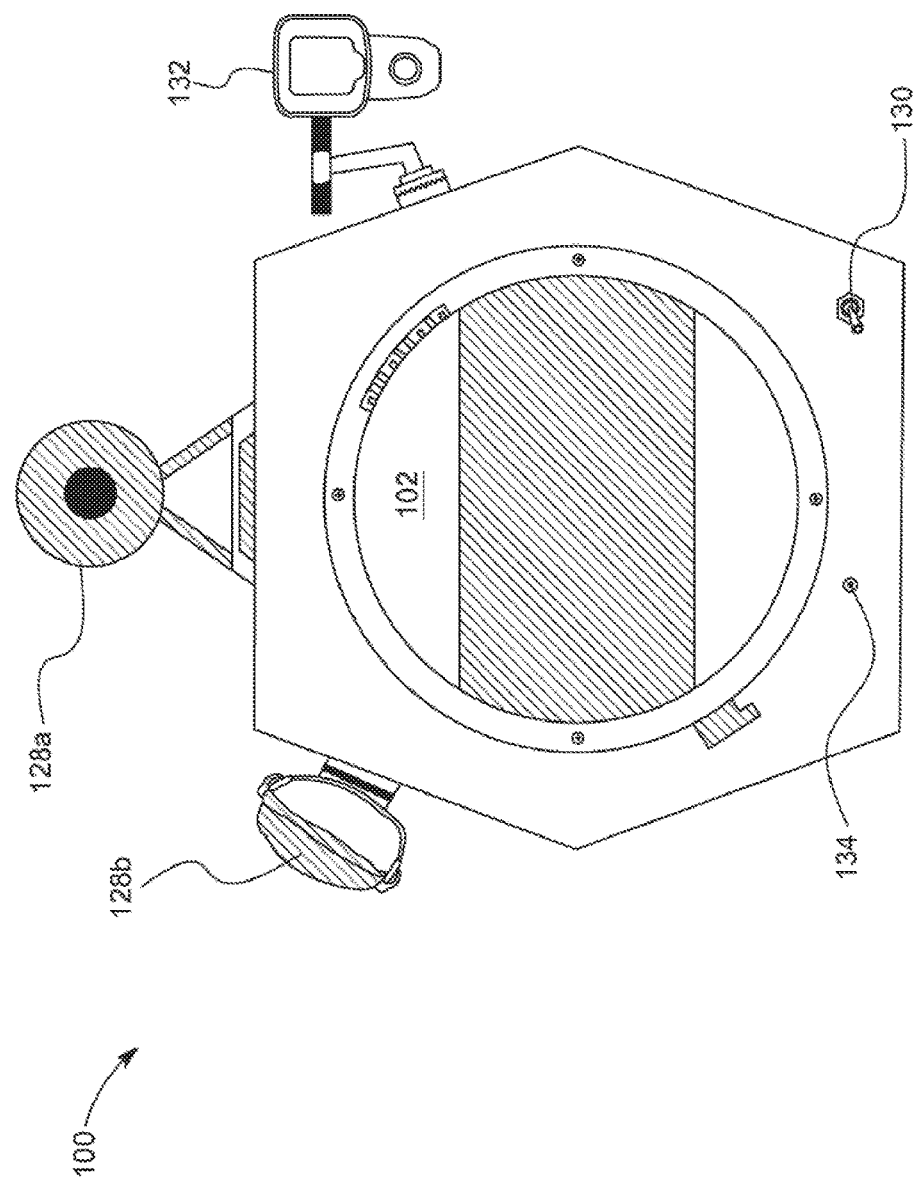
FIG. 3 illustrates a front view of the ultra-high resolution cinema camera system shown in FIG. 1, in accordance with an embodiment of the present invention.

In one embodiment as shown in FIGS. 1-3, at least one handle 128a, 128b joins with the housing 118. The handle 128a, 128b is configured to facilitate manipulation of the camera system 100. The handle 128a, 128b may include an elongated top handle 128a grip fabricated from black carbon fiber that can be gripped by the hand, and a side handle 128b grip with a strap and stained wood that wraps around the hand. In other embodiments, the handle 128a-b may include various grips, bars, and handles known in the art of cinema cameras.

Turning now to FIG. 4, which illustrates a sectional view to show the internal components of the camera system 100 showing an image sensor 104 to optimize collection of the light from the 120 mm image format lens 102. The image sensor 104, in essence, serves as the electronic equivalent of film. The present invention utilizes an image sensor 104 that is generally larger than known in the industry. In one embodiment, the image sensor 104 is a 120 mm×67.5 mm sensor with full gate dimensions. The image sensor 104 may operate with an ultra-high 8692×4889 8.6K resolution that is configured to optimize collection of the light from the lens 102. Further, the image sensor 104 may include a solid-state device (not shown), adapted to efficiently capture light from the 120 mm lens 102, and then convert the captured light through a viewfinder 132 or LCD monitor into an image.

In one embodiment, the image sensor 104 captures 120 mm×67.5 mm RAW and PRORES HDR 8692×4889 footage in both the industry standard 16×9 (1.77:1) aspect ratio, and the anamorphic aspect ratios of 2×(3.55:1); 1.5×(2.66:1); 1.35×(2.39:1); and 1.33×(2.35:1) at up to 120 fps.

In some embodiments, the image sensor 104 comprises a plurality of photosites 106 that convert the light into a binary signal. The photosites 106 may include 13.8 um (um=micron) photosites 106. The 13.8 micron size of the photosites 106 enables more light into each collection bin than other cinema cameras known in the art. As illustrated in FIG. 4, the image sensor 104 contains all the photosites 106, (also known as megapixels) in the darkened area contained within the borders of the image sensor 104 (as shown in FIG. 4).

It is significant to note, however, that the light conversion to binary signals occurs in a combination of places, beyond just the photosites 106. For example, the light is initially collected in the photosites 106 and when all the photosites 106 are full, the light is dumped to the collection hardware that reads the photons and converts them into a readable electrical signal, i.e. binary signal. This binary signal is processed by the FPGA 108 and converted to a visible signal that is distributed by a signal distribution portion 112 to signal distribution ports 114a-g.

A multi-channel cable 116 transmits the binary signal from the photosites 106 in the image sensor 104 to the FPGA 108. The FPGA 108 converts the binary signal into RAW or ProRes video files. The binary signal is converted through Analog-to-Digital technology (not shown).

In one embodiment, a 14 bit low voltage differential signaling (LVDS) (not shown) transmits the binary signal to the Field programmable gate array 108. The LVDS hardware is disposed on the rear of the image sensor 104 (transmission end) and at the edge of the FPGA 108 (receiving end). A multi-channel cable 116 connects the image sensor 104 to the FPGA 108).

Once the binary signal is converted to RAW or ProRes video files, the FGPA 108 distributes the RAW or ProRes video files to a recording bank, a monitoring bank, and a plurality of signal distribution ports 114a-g.

In addition to the image sensor 104 and FPGA 108, the camera system 100 stores the binary data at high speeds in a plurality of stacked and interconnected embedded multi-media controller memory units 110 (eMMC) as shown in FIG. 4. The eMMC 110 is unique in that by stacking multiple memory units, a fast and extremely large memory bank is formed. Thus, the eMMC 110 with the FGPA 108 have the capacity to generate a larger memory. The eMMC 110 provides the needed boost in memory to process the amount of data created by the FPGA 108 at the required speeds.

A signal distribution portion 112 is operatively connected to the eMMC 110 through the multi-channel cable 116. The signal distribution portion 112 is operable to distribute the RAW or ProRes video file through a monitoring bank, a recording bank, and a plurality of signal distribution ports 114a-g. In some embodiments, the signal distribution ports 114a-g may include, without limitation, an Ethernet port 114c-d, an HDMI port 114e-f, a USB 3.0 port 114g, and an output audio port 114a-b. Further the camera system 100 of the present invention allows signal distribution using wired or wireless video-over-IP (internet protocol) technology. Further the camera system 100 may be controlled remotely using a remote controller.

Turning now to FIG. 5, the housing 118 supports a control panel 136 that is operable to control the camera system 100, and specifically the image sensor 104, FPGA 108, and eMMC 110. The control panel 136 may include a touch screen that regulates aspects of a camera known in the art. Further, a battery mount 140 is adapted on the housing 118. The battery mount 140 is operable to operatively mate with a power source that powers the camera system 100. In some embodiments, a power switch 130 is operable to regulate powering on and off the camera system 100. The power switch 130 may include a toggle or a button with a flip cover, as shown in FIG. 2.

For operation of the camera system 100, a viewfinder eyepiece assembly 132 is attached to the housing 118 (FIGS. 1-3), so that a camera operator may compose and focus an image through the 120 mm image format lens 102. Further, a recording switch 138 is operable to regulate capturing a video of the image; whereby depressing the recording switch 138 initiates capturing the image as a video. A recording light 134 indicates when the video is operational. The camera system 100 is generally automated and portable to facilitate filming modern cinematography.

Figure 6:
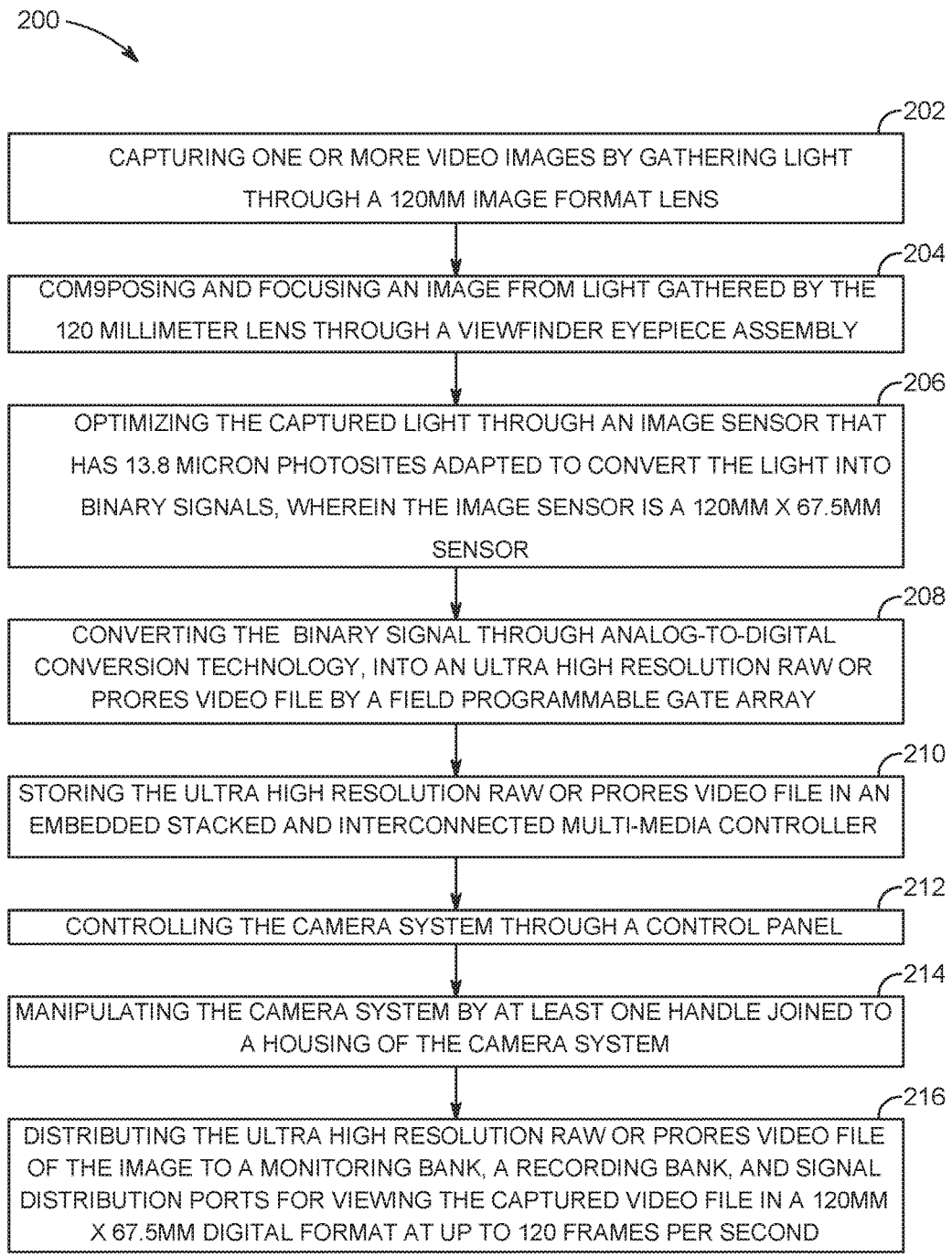
FIG. 6 illustrates a flowchart of an exemplary method for capturing an ultra high resolution video image file using the ultra-high resolution cinema camera system, in accordance with an embodiment of the present invention.

According to another aspect of the present invention as shown in FIG. 6 that illustrates a flowchart of an exemplary method 200 for capturing an ultra high resolution video image file. The method may include an initial Step 202 of capturing one or more video images by gathering light through a 120 mm image format lens. The method 200 may further comprise a Step 204 of composing and focusing an image from light gathered by the 120 mm lens through a viewfinder eyepiece assembly. A Step 206 includes optimizing the captured light through an image sensor that has 13.8 micron photosites adapted to convert the light into binary signals, wherein the image sensor is a 120 mm×67.5 mm sensor. Step 208 comprises converting the binary signal through Analog-to-Digital Conversion technology, into an ultra high resolution RAW or ProRes video file by a field programmable gate array. A Step 210 comprises storing the ultra high resolution RAW or ProRes video file in an embedded stacked and interconnected Multi-Media Controller. A Step 212 includes controlling the camera system through a control panel. A Step 214 includes manipulating the camera system by at least one handle joined to a housing of the camera system. A Step 216 comprises distributing the ultra high resolution RAW or ProRes video file of the image to a monitoring bank, a recording bank, and signal distribution ports for viewing the captured video file in a 120 mm×67.5 mm digital format RAW and PRORES HDR 8692×4889 8.6K resolution video data in both the industry standard 16×9 (1.77:1) aspect ratio, and the anamorphic aspect ratios of 2×(3.55:1); 1.5×(2.66:1); 1.35×(2.39:1); and 1.33×(2.35:1) at up to 120 frames per second.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:
1. An ultra-high resolution cinema camera system, the camera system comprising:
   a housing defined by an outer surface and an inner surface that form a cavity;
   a power source for powering the camera system;
   a switch operable to regulate capturing a image or video data;
   a 120 mm lens operable to capture light from the image or video data;
   an image sensor operable to optimize the captured light from the 120 mm lens, the image sensor comprising a plurality of photosites, the photosites defined by dimensions of 13.8 microns, the photosites operable to convert the light to a binary signal through one or more analog-to-digital converters;
   a field programmable gate array operatively connected to the image sensor through a multi-channel cable, the field programmable gate array is operable to convert the binary signal to an ultra-high resolution RAW or ProRes image or video data;
   a plurality of embedded stacked and interconnected memory units operatively connected to the field programmable gate array through the multi-channel cable, the plurality of stacked and interconnected memory units operable to store the ultra-high resolution RAW or ProRes image or video data;

a signal distribution portion operatively connected to the plurality of stacked and interconnected memory units through the multi-channel cable, the signal distribution portion operable to distribute the ultra-high resolution RAW or ProRes image or video data through at least one of the following: a monitoring bank, a recording bank, and a plurality of signal distribution ports; and a control panel operable to control the camera system.

2. The camera system of claim 1, wherein the image sensor captures 120 mm×67.5 mm digital format RAW and PRORES HDR 8692×4889 8.6K resolution video data in both the industry standard 16×9 (1.77:1) aspect ratio, and the anamorphic aspect ratios of 2×(3.55:1); 1.5×(2.66:1); 1.35× (2.39:1); and 1.33×(2.35:1) at up to 120 fps.

3. The camera system of claim 1, wherein the plurality of signal distribution ports is selected from the group consisting of an Ethernet port, an HDMI port, a USB 3.0 port, and an output audio port.

4. The camera system of claim 1, wherein the camera system further comprises a viewfinder eyepiece assembly operable to enable composing and focusing an image from light gathered by the 120 mm lens.

5. The camera system of claim 1, wherein the camera system further comprises at least one handle joined with the housing, the at least one handle operable to facilitate manipulation of the camera system.

6. The camera system of claim 1, wherein the housing further comprises one or more air vents operable to enable passage of air in and out of the cavity of the housing.

7. The camera system of claim 1, wherein the power source is a rechargeable battery.

8. The camera system of claim 1, wherein the housing is fabricated from material that is selected from the group consisting of Kevlar, Fiberglass, Nylon, and Carbon Fiber, further the outer and the inner surfaces of the housing are coated with a polymer-ceramic composition.

9. The camera system of claim 1, wherein the housing is fabricated using a 3-dimensional printer.

10. The camera system of claim 1, wherein the control panel comprises a touch screen.

11. An automatic ultra-high resolution cinema camera system, the camera system comprising:

a housing defined by an outer surface and an inner surface that form a cavity, the housing forming an air vent operable to enable passage of air in and out of the cavity of the housing, wherein the housing is fabricated from material that is selected from the group consisting of Kevlar, Fiberglass, Nylon, and Carbon Fiber, further the outer and the inner surfaces of the housing is coated with a polymer-ceramic composition;

at least one handle joined with the housing, the at least one handle operable to facilitate manipulation of the camera system;

a rechargeable battery mount operable to operatively mate with a power source for powering the camera system;

a power switch operable to regulate powering on and off the camera system;

a recording switch operable to regulate capturing a video;

a recording light operatively connected to the recording switch to indicate that the video is being captured;

a 120 mm lens operable to capture light for the video image;

a viewfinder eyepiece assembly operable to enable composing and focusing an image from light gathered by the 120 mm lens;

an image sensor includes a solid-state device, adapted to efficiently capture light from the 120 mm lens and optimizes the captured light from the 120 mm lens, the image sensor comprising a plurality of photosites, the photosites defined by dimensions of 13.8 microns, the photosites operable to convert the light to a binary signal through an analog-to-digital converter, wherein the image sensor is a 120 mm×67.5 mm sensor;

a field programmable gate array operatively connected to the analog-to-digital converter of the image sensor through a 14 bit low voltage differential signaling (LVDS) thereby facilitating to transmit the binary signal to the field programmable gate array through a multi-channel cable, the field programmable gate array operable to convert the binary signal to an ultra-high resolution RAW or ProRes video data;

a plurality of embedded stacked and interconnected memory units operatively connected to the field programmable gate array through the multi-channel cable, the plurality of stacked and interconnected memory units operable to store the RAW or ProRes video data;

a signal distribution portion operatively connected to the plurality of stacked and interconnected memory units through the multi-channel cable, the signal distribution portion operable to distribute the RAW or ProRes video data through at least one of the following: a monitoring bank, a recording bank, and a plurality of signal distribution ports; and a control panel operable to control the camera system.

12. The camera system of claim 11, wherein the camera system comprises a portable digital camera.

13. The camera system of claim 11, wherein the image sensor captures 120 mm×67.5 mm digital format RAW and PRORES HDR 8692×4889 8.6K resolution video data in both the industry standard 16×9 (1.77:1) aspect ratio, and the anamorphic aspect ratios of 2×(3.55:1); 1.5×(2.66:1); 1.35× (2.39:1); and 1.33×(2.35:1) at up to 120 frames per second.

14. The camera system of claim 11, wherein the plurality of signal distribution ports is selected from the group consisting of an Ethernet port, an HDMI port, a USB 3.0 port, and an output audio port.

15. The camera system of claim 11, wherein the control panel comprises a touch screen.

16. The camera system of claim 11, wherein the handle comprises a top handle fabricated from black carbon fiber and a side grip handle that is configured to wrap around hand of a user.

17. The camera system of claim 11, wherein the power switch is a toggle switch with a flip cover.

18. A method for capturing an ultra high resolution video image file, wherein the method comprises:

capturing one or more video images by gathering light through a 120 mm image format lens;

composing and focusing an image from light gathered by the 120 mm lens through a viewfinder eyepiece assembly;

optimizing the captured light through an image sensor that has 13.8 micron photosites adapted to convert the light into binary signals, wherein the image sensor is a 120 mm×67.5 mm sensor;

converting the binary signal through Analog-to-Digital Conversion technology, into an ultra high resolution RAW or ProRes video file by a field programmable gate array;

storing the ultra high resolution RAW or ProRes video file in an embedded stacked and interconnected Multi-Media Controller;

controlling the camera system through a control panel;

manipulating the camera system by at least one handle joined to a housing of the camera system; and distributing the ultra high resolution RAW or ProRes video file of the image to a monitoring bank, a recording bank, and signal distribution ports for viewing the captured video file in a 120 mm×67.5 mm digital format RAW and PRORES HDR 8692×4889 8.6K resolution video data in both the industry standard 16×9 (1.77:1) aspect ratio, and the anamorphic aspect ratios of 2×(3.55:1); 1.5×(2.66:1); 1.35×(2.39:1); and 1.33× (2.35:1) at up to 120 frames per second.

19. The method of claim 18, wherein the plurality of signal distribution ports is selected from the group consisting of an Ethernet port, an HDMI port, a USB 3.0 port, and an output audio port.

20. The method of claim 18, wherein the housing is fabricated in a 3-dimensional printer using materials selected from the group consisting of Kevlar, Fiberglass, Nylon, and Carbon Fiber, further the outer and the inner surfaces of the housing is coated with a polymer-ceramic composition.

\* \* \* \* \*